US007903978B2

(12) United States Patent
Stephens et al.

(10) Patent No.: US 7,903,978 B2
(45) Date of Patent: Mar. 8, 2011

(54) OPTICAL TRANSMISSION SYSTEMS AND AMPLIFIER CONTROL APPARATUSES AND METHODS

(75) Inventors: Thomas D. Stephens, Austin, TX (US); Mark A. Kelty, Catonsville, MD (US); Alistair J. Price, Ellicott City, MD (US)

(73) Assignee: Broadwing, LLC, Broomfield, CO (US)

( * ) Notice: Subject to any disclaimer, the term of this patent is extended or adjusted under 35 U.S.C. 154(b) by 935 days.

(21) Appl. No.: 11/635,303

(22) Filed: Dec. 7, 2006

(65) Prior Publication Data

US 2007/0086779 A1      Apr. 19, 2007

Related U.S. Application Data

(63) Continuation of application No. 10/936,074, filed on Sep. 8, 2004, now abandoned, which is a continuation of application No. 10/390,378, filed on Mar. 17, 2003, now abandoned, which is a continuation of application No. 09/317,141, filed on May 21, 1999, now Pat. No. 6,563,614.

(51) Int. Cl.
*H04B 10/00* (2006.01)

(52) U.S. Cl. ........................... 398/160; 398/158; 398/173

(58) Field of Classification Search .......... 398/158–160, 398/173, 175
See application file for complete search history.

(56) References Cited

U.S. PATENT DOCUMENTS

| 4,963,832 | A | 10/1990 | Desurvire et al. |
| 4,971,417 | A | 11/1990 | Krinsky et al. |
| 5,007,705 | A | 4/1991 | Morey et al. |
| 5,088,095 | A | 2/1992 | Zirngibl |
| 5,117,196 | A | 5/1992 | Epworth et al. |
| 5,223,705 | A | 6/1993 | Aspell et al. |
| 5,239,607 | A | 8/1993 | da Silva et al. |
| 5,268,786 | A | 12/1993 | Matsushita et al. |
| 5,299,055 | A | 3/1994 | Yoneyama |
| 5,455,704 | A | 10/1995 | Mizuochi et al. |
| 5,506,724 | A | 4/1996 | Shimizu et al. |
| 5,563,731 | A | 10/1996 | Asahi |
| 5,570,227 | A | 10/1996 | Nabeyama et al. |

(Continued)

FOREIGN PATENT DOCUMENTS

EP       0651476       10/1994

(Continued)

OTHER PUBLICATIONS

Park, S.Y, et al., Feasibility Demonstration of 10 Gbit/s Channel WDM Network Using Dynamic Gain-Controlled EDFAs, Electronics Letters, Mar. 5, 1998, vol. 34, No. 5, Online No. 19980346.

(Continued)

*Primary Examiner* — Agustin Bello

(57) ABSTRACT

Optical systems of the present invention generally include an optical signal controller disposed along an optical link between two optical nodes. The optical signal controller is configured to provide a monitoring signal from an optical signal passing between the nodes as a plurality of wavelength sub-bands at least one of which includes a plurality of signal channels. The controller generates a compensating channel having an optical power that is a function of the monitoring signal power in the plurality of wavelength sub-bands or total power. The compensating channel is combined with the optical signal to compensate for power variations in the optical signal passing between the nodes. In addition, the compensating channels can be used to transmit communication or system supervisory information between monitoring points and/or nodes in the system.

23 Claims, 9 Drawing Sheets

U.S. PATENT DOCUMENTS

| | | | |
|---|---|---|---|
| 5,764,404 | A | 6/1998 | Yamane et al. |
| 5,841,557 | A | 11/1998 | Otsuka et al. |
| 5,857,043 | A | 1/1999 | Cook et al. |
| 5,861,981 | A | 1/1999 | Jabr |
| 5,864,414 | A | 1/1999 | Barnsley et al. |
| 5,870,217 | A | 2/1999 | Itou et al. |
| 5,872,649 | A | 2/1999 | Bryon et al. |
| 5,900,968 | A | 5/1999 | Srivastava et al. |
| 5,900,969 | A | 5/1999 | Srivastava et al. |
| 5,907,420 | A | 5/1999 | Chraplyvy et al. |
| 5,907,429 | A * | 5/1999 | Sugata ............... 359/341.42 |
| 5,914,794 | A | 6/1999 | Fee et al. |
| 5,923,453 | A | 7/1999 | Yoneyama |
| 5,926,304 | A * | 7/1999 | Tajima ............... 398/181 |
| 5,940,209 | A | 8/1999 | Nguyen |
| 5,978,122 | A | 11/1999 | Kawazawa et al. |
| 5,986,800 | A | 11/1999 | Kosaka |
| 6,038,062 | A * | 3/2000 | Kosaka ............... 359/337 |
| 6,172,782 | B1 | 1/2001 | Kobayashi |
| 6,252,699 | B1 | 6/2001 | Kohn |
| 6,317,255 | B1 * | 11/2001 | Fatehi et al. ............ 359/341.44 |
| 6,563,614 | B1 * | 5/2003 | Stephens et al. ............ 398/5 |
| 6,602,002 | B1 | 8/2003 | Srivastava et al. |
| 6,731,877 | B1 | 5/2004 | Cao |
| 2001/0015836 | A1 | 8/2001 | Kim et al. |

FOREIGN PATENT DOCUMENTS

| | | |
|---|---|---|
| EP | 0792035 | 2/1997 |
| EP | 0829981 | 9/1997 |
| EP | 0838913 | 4/1998 |
| EP | 0881790 | 5/1998 |
| EP | 0887953 | 6/1998 |
| EP | 0853396 A2 | 7/1998 |
| EP | 0910182 | 4/1999 |
| JP | 10-242943 | 3/1997 |
| JP | 10-256633 | 3/1997 |
| JP | 10-247896 | 3/1998 |
| JP | 10-262032 | 12/1998 |

OTHER PUBLICATIONS

Srivastava, A.K., et al., Fast Gain Control in an Erbium-Doped Fiber Amplifier, Jul. 1996, Optical Fiber Communication Postdeadline Papers 1996.

Na, K.W., et al., Rate equation model for gain-clamped erbium-doped fibre amplifiers, Apr. 15, 1999, vol. 35, No. 8, p. 663, Electronics Letters.

Kishi, Naoto and Yazaki, Tomonori; Frequency Control of a Single-Frequency Fiber Laser by Cooperatively Induced Spatial-Hole Burning, Feb. 1999, vol. 11, No. 2, p. 182, IEEE Photonics Technology Letters.

Desurvire Emmanuel, Erbium-Doped Fiber Amplifiers Principles and Applications, 1994, pp. 469-480, 717-718, A Wiley-Interscience Publication. Published by John Wiley & Sons, Inc.

Desurvire, E., et al., Dynamic Gain Compensation in Saturated Erbium-Doped Fiber Amplifiers, May 1991, vol. 3, No. 5pp. 453-455, IEEE Photonics Technology Letters.

Elllis, A.D., et al., Automatic Gain Control in Cascaded Erbium Doped Fibre Amplifier Systems, Jan. 31, 1991, vol. 27, No. 3, pp. 193-195, Electronic Letters.

Sun, Y. and Srivastava, A. K., Dynamic Effects in Optically Amplified Networks, Jul. 1997, Optical Society of America Technical Digest-Optical Amplifiers and their Applications.

Zirngibl, M., Gain Control in Erbium-Doped Fibre Amplifiers by an All-Optical Feedback Loop, Mar. 28, 1991, vol. 27, No. 7., pp. 560-561, Electronic Letters.

Edagawa, N., et al., First Field Demonstration of Optical Submarine Cable Systems using LD-Pumped Er-Doped Optical Fibre Amplifier, Sep. 14, 1989, vol. 25, No. 19, pp. 1278-1280.

Luo, G., et al., Relaxation Oscillations and Spectral Hole Burning in Laser Automatic Gain Control of EDFAs, 1997, p. 130, OFC '97 Technical Digest.

Zyskind, J. L., et al., Fast Power Transients in Optically Amplified Multi-wavelength Optical Networks, Feb. 29, 1996, Optical Fiber Communication Post-Deadline Paper 1996, p. PD 31.

Takushima, Yuichi, et al., Gain Spectrum Equalization of All-Optical Gain-Clamped Erbium-Doped Fiber Amplifier, Feb. 1999, vol. 11, No. 2, pp. 176-178, IEEE Photonics Technology Letters.

Karasek, M.; van der Plaats, J.C., Protection of surviving channels in a cascade of pump-loss controlled gain-locked EDFA's, Jul.-Sep. 1998, vol. 12, No. 3, pp. 105-112, International Journal of Optoelectronics.

Srivastava, A.K., et al., Fast-Link Control Protection of Surviving Channels in Multiwavelength Optical Networks, Dec. 1997, vol. 9, No. 12, pp. 1667-1669, IEEE Photonics Technology Letters.

Wagner, Richard E., et al., MONET: Multiwavelength Optical Networking, Jun. 1996, vol, 14, No. 6, pp. 1349-1355, Journal of Lightwave Technology.

Zyskind, J. L., et al., Fast Link Control Protection for Surviving Channels in Multiwavelength Optical Networks, 1996, pp. 5.49-5.52, 22nd European Conference on Optical Communications, ECOC '96 Oslo.

Jackel, Janet Lehr, et al., All-Optical Stabilization of Cascaded Multichannel Erbium-Doped Fiber Amplifiers with Changing Numbers of Channels, 1997, pp. 84-85, OFC '97 Technical Digest.

Kashyap, R., et al., Wavelength Flattened Saturated Erbium Amplifier Using Multiple Side Tap Bragg Gratings, May 27, 1993, vol. 29, No. 11 ,pp. 1025-1026, Electronic Letters.

Massicott, J.F., et al., 1480nm Pumped Erbium Doped Fibre Amplifier with All Optical Automatic Gain Control, Jun. 9, 1994, vol. 30., No. 12, pp. 962-964 Electronics Letter.

Delevaque, E., et al., Gain Control in Erbium-Doped fibre amplifiers by lasing at 1480nm with photoinduced Bragg Gratings written on Fibre Ends, Jun. 10, 1993, vol. 29, No. 12, pp. 1112-1114, Electronic Letters.

Ibsen, M., et al., 8-and 16-Channel All-Fiber DFB Laser WDM Transmitters with Integrated Pump Redundancy, IEEE Photonics Technology Letters, pp. 1114-1116, vol. II, No. 9, Sep. 1999.

Van Atta, D.T., et al., AT&T Technical Journal, Jan./Feb. 1995, vol. 74, No. 1.

* cited by examiner

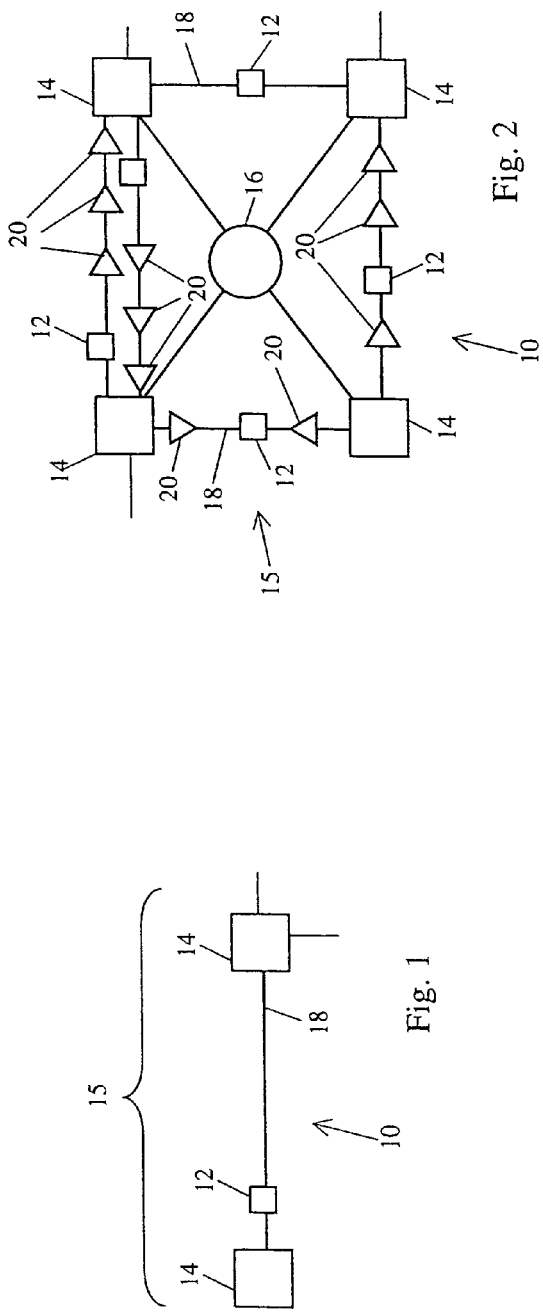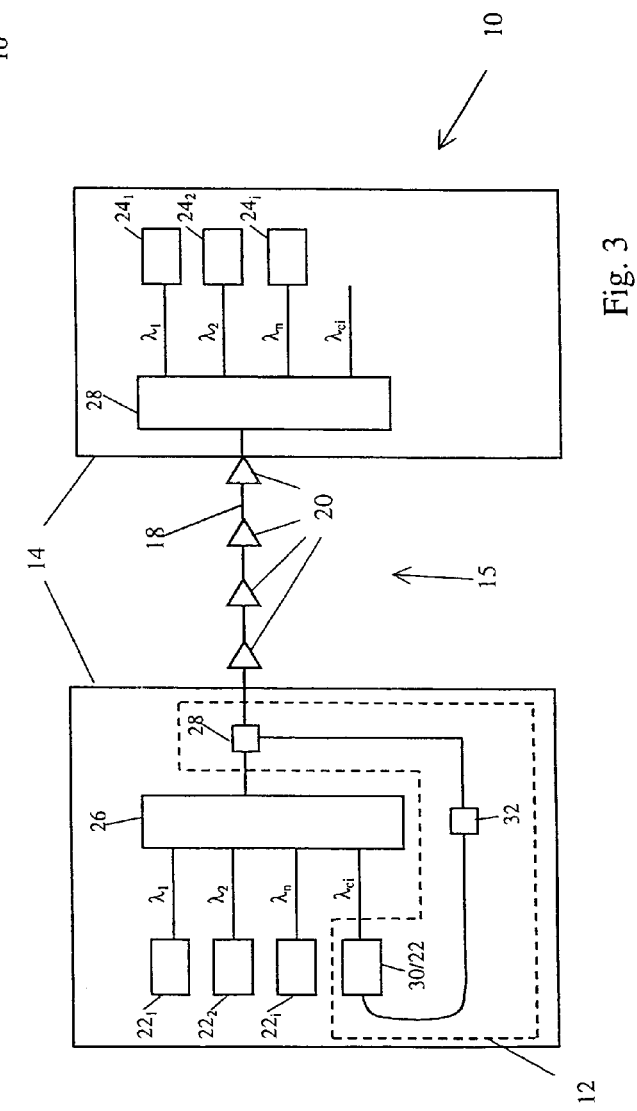

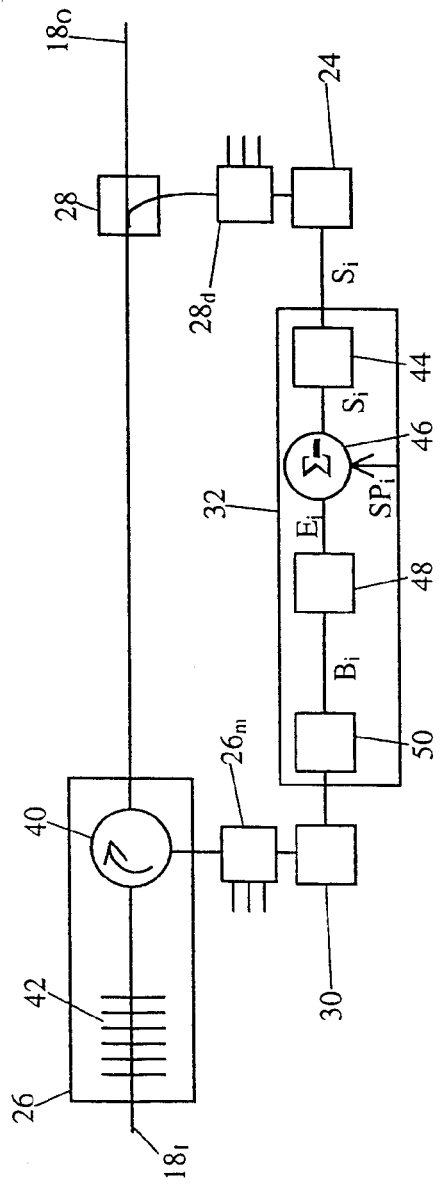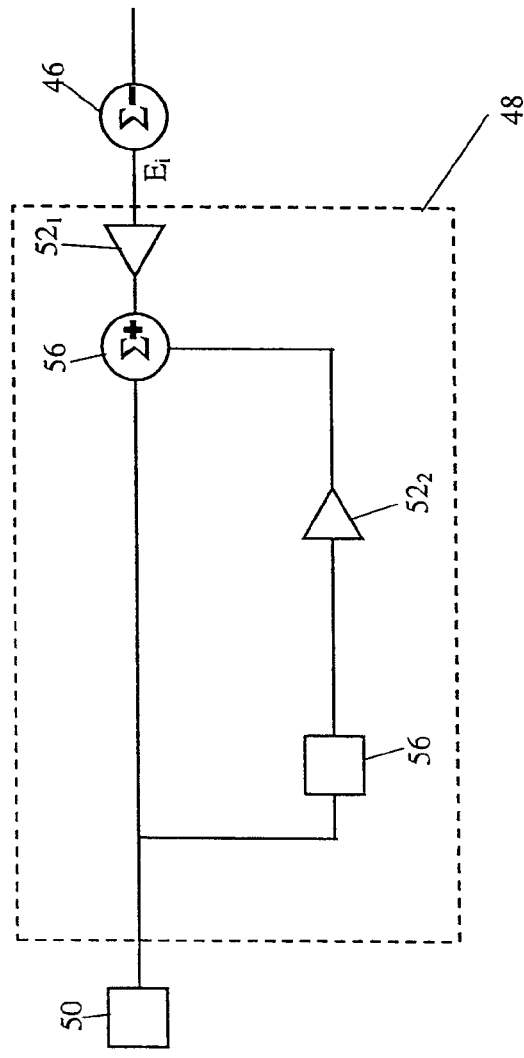
Fig. 5(a)
Fig. 5(b)

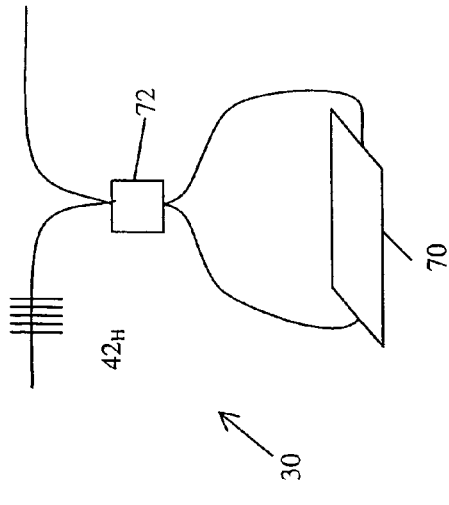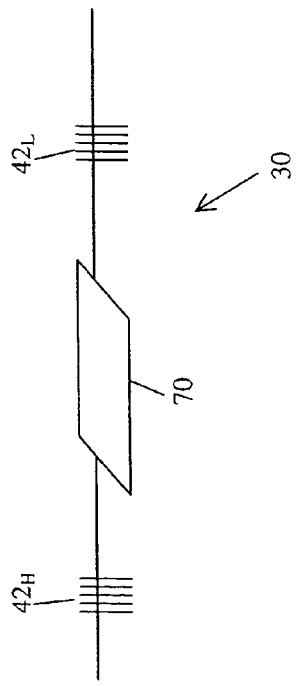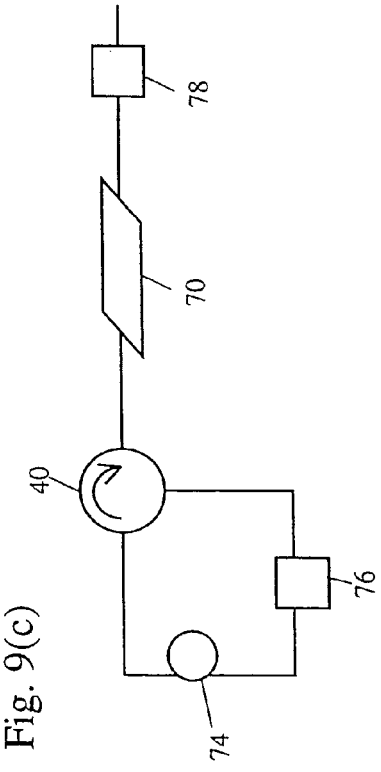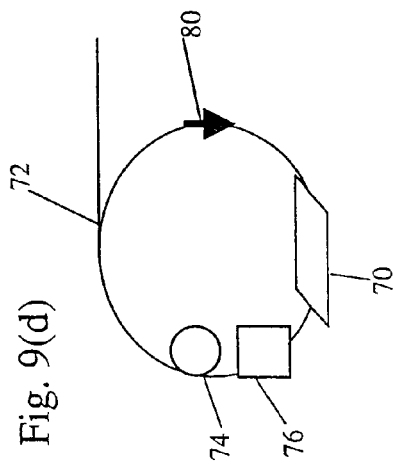

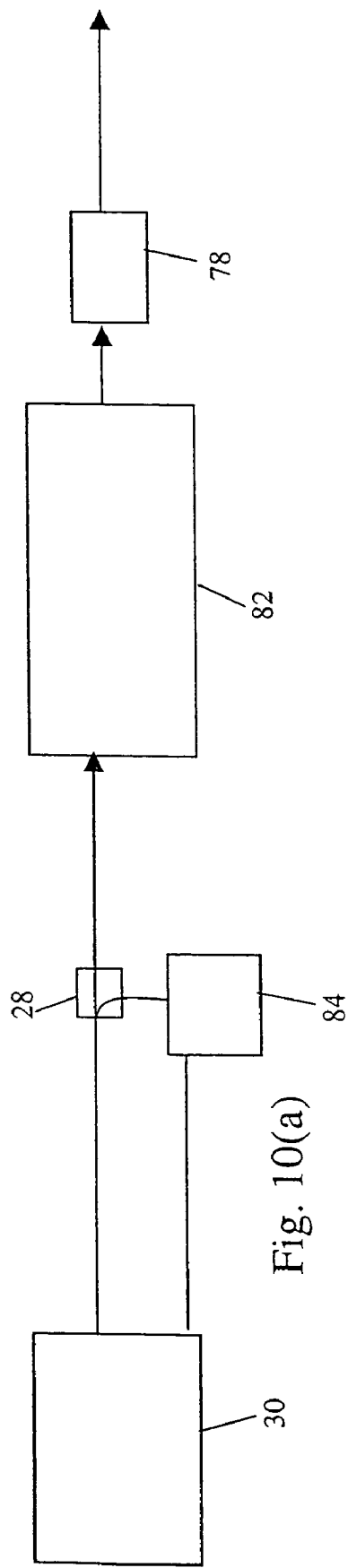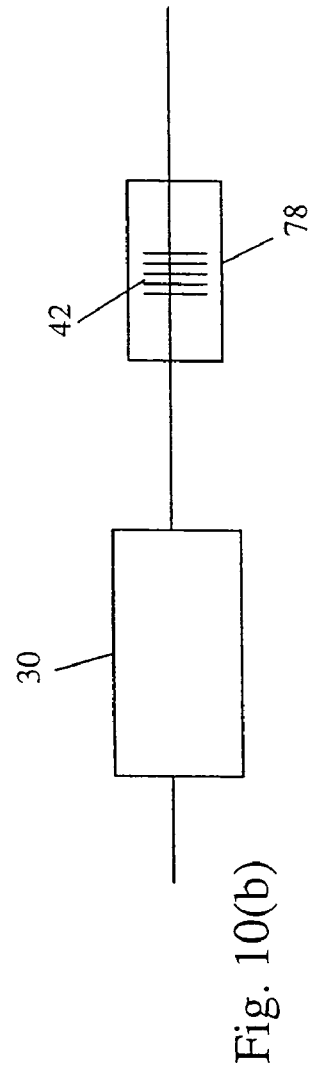
Fig. 10(a)
Fig. 10(b)

OPTICAL TRANSMISSION SYSTEMS AND AMPLIFIER CONTROL APPARATUSES AND METHODS

CROSS-REFERENCE TO RELATED APPLICATIONS

This application is a continuation of co-pending U.S. patent application Ser. No. 10/936,074, filed Sep. 8, 2004, which is a continuation of U.S. patent application Ser. No. 10/390,378, filed Mar. 17, 2003, now abandoned, which is a continuation of U.S. patent application Ser. No. 09/317,141, filed May 21, 1999, now U.S. Pat. No. 6,563,614.

STATEMENT REGARDING FEDERALLY SPONSORED RESEARCH OR DEVELOPMENT

Not Applicable

BACKGROUND OF THE INVENTION

The present invention is directed generally to optical transmission systems. More particularly, the invention relates to controlling optical signal characteristics in optical links including links containing optical amplifiers, such as erbium doped fiber amplifiers ("EDFAs").

Digital technology has provided electronic access to vast amounts of information. The increased access has driven demand for faster and higher capacity electronic information processing equipment (computers) and transmission networks and systems to link the processing equipment.

In response to this demand, communications service providers have turned to optical communication systems, which have the capability to provide substantially larger information bandwidth transmission capacities than traditional electrical communication systems. Information can be transported through optical systems in audio, video, data, or other signal formats analogous to electrical systems. Likewise, optical systems can be used in telephone, cable television, LAN, WAN, and MAN systems, as well as other communication systems.

Early optical transmission systems, known as space division multiplex (SDM) systems, transmitted one information signal using a single wavelength in separate waveguides, i.e. fiber optic strand. The transmission capacity of optical systems was increased by time division multiplexing (TDM) multiple low bit rate, information signals into a higher bit rate signals that can be transported on a single optical wavelength. The low bit rate information carried by the TDM optical signal can then be separated from the higher bit rate signal following transmission through the optical system.

The continued growth in traditional communications systems and the emergence of the Internet as a means for accessing data has further accelerated the demand for higher capacity communications networks. Telecommunications service providers, in particular, have looked to wavelength division multiplexing (WDM) to further increase the capacity of their existing systems.

In WDM transmission systems, pluralities of distinct TDM or SDM information signals are carried using electromagnetic waves having different wavelengths in the optical spectrum, i.e., far-UV to far-infrared. The pluralities of information carrying wavelengths are combined into a multiple wavelength WDM optical signal that is transmitted in a single waveguide. In this manner, WDM systems can increase the transmission capacity of existing SDM/TDM systems by a factor equal to the number of wavelengths used in the WDM system.

Optical WDM systems were not initially deployed, in part, because of the high cost of electrical signal regeneration/amplification equipment required to compensate for signal attenuation for each optical wavelength throughout the system. The development of the erbium doped fiber optical amplifier (EDFA) provided a cost effective means to optically regenerate attenuated optical signal wavelengths in the 1550 nm range. In addition, the 1550 nm signal wavelength range coincides with a low loss transmission window in silica based optical fibers, which allowed EDFAs to be spaced further apart than conventional electrical regenerators.

The use of EDFAs essentially eliminated the need for, and the associated costs of, electrical signal regeneration/amplification equipment to compensate for signal attenuation in many systems. The dramatic reduction in the number of electrical regenerators in the systems, made the installation of WDM systems in the remaining electrical regenerators a cost effective means to increase optical network capacity.

EDFAs have proven to be a versatile, dependable, and cost effective optical amplifier in optical transmission system. EDFAs can amplify optical signals over a wavelength range spanning from approximately 1500 nm to 1600 nm. In addition, the amplification is polarization independent and introduces only low levels of channel to channel crosstalk.

However, the characteristics that make EDFAs so useful, also have some negative side effects. For example, because EDFAs provide gain over a wavelength range of the WDM signal, the amplification of the each channel varies with the power of the channel, as well as the total WDM signal power. Therefore, if a channel is added or dropped or a channel has a power variation, all of the channels will experience a gain variation that adversely affects the signal quality.

In addition, EDFAs do not equally amplify each channel within the wavelength range. Thus, when channels are added or dropped or a channel has a power variation, the remaining channels will not only incur gain variations, but the gain variations will generally be nonuniformly distributed across the remaining channels.

The signal degradation resulting from nonuniform gain variations across the wavelength range is compounded in systems having cascaded EDFAs as would be expected. The gain variations, especially in cascaded amplifier chains, can introduce system instability and noise that results in signal distortion, attenuation, and/or loss, and greatly diminish WDM system performance.

Automatic gain control ("AGC") and automatic power control ("APC") techniques have been developed to compensate for or suppress channel gain variations in EDFAs. AGC and APC schemes for controlling amplifiers are generally-similar in operation owing to the amplifier relationship that $Power_{OUT}/Power_{IN}=Gain$.

AGC and APC, schemes can generally be categorized as feedback or feed-forward amplifier control schemes depending upon whether the signal is monitored after passing through the amplifier or before entering the amplifier. A general description of AGC and APC schemes can be found in "Erbium-Doped Fiber Amplifiers, Principles and Applications" by Emmanuel Desurvire (1994), pp. 469-480 ("EDFA94"), which is incorporated herein by reference. A brief, more recent summary is provided in "Dynamic Effects in Optically Amplified Networks", Optical Amplifiers and their Applications ("OAA") Jul. 21-23, 1997, MC4-1-4, ("OAA97-1")

Amplifier control in either scheme is generally achieved by one of two methods. The first method is to control the amplifier gain or power by varying the amplifier pump power in response to the monitored signal, such as described in U.S. Pat. Nos. 4,963,832 and 5,117,196. The second method is to introduce a compensating, or control, signal to control the amplifier gain or power, such as described in U.S. Pat. No. 5,088,095 and "Dynamic Gain Compensation in Saturated Erbium-Doped Amplifiers", *IEEE Photonics Technology Letters*, v3, n5, pp. 453-455 (1991) ("PT91-1").

Feedback control can be based on monitoring one or more signal channels or pilot tones, and/or optical noise at the exit of the amplifier, as described in the above-referenced documents. Further examples of pilot tone monitoring can be found in Electronics Letters, Sep. 14, 1989, v25, n19, pp. 1278-1280, ("EL89-1") and total optical power monitoring can be found more recently in OAA Jul. 11-13, 1996, PDP4-1-5 ("OAA96-1"). In U.S. Pat. No. 5,506,724, ASE associated with a counter-propagating compensating/control channel is monitored to provide feedback control over the control channel.

All optical gain control methods are described in Electronics Letters, Mar. 28, 1991, v27, n7, pp. 560-1, ("EL91-1") and U.S. Pat. No. 5,239,607. The all optical AGC schemes couple amplified spontaneous emission ("ASE") from the amplifier through a feedback loop, which is injected into the amplifier input to form a ring laser. The formation of the ring laser locks the gain of the amplifier independent of the input power of the signal at other wavelengths.

Feedback schemes are generally desirable, because the schemes can also account for changes that occur in amplifier performance over time, as well as the input power changes. See "Automatic Gain Control in Cascaded Erbium Doped Fibre Amplifier Systems", Electronics Letters, Jan. 31, 1991, v27, n3, pp. 193-195, ("EL91-2").

Conversely, feed-forward schemes do not inherently account for variations in amplifier performance. However, feed-forward schemes in amplifier chains can indirectly account for variations in preceding amplifiers, because the variations will generally evidence themselves in input power variations in successive amplifiers.

An advantage of feed-forward schemes, as discussed in PT91-1, is that the schemes can be implemented without feedback from remote amplifier sites. Therefore, feed-forward control loops can be deployed at logistically convenient locations in a network and operated independently from the amplifiers, as discussed in EL91-2. Also, feed-forward schemes allow the WDM signal to be monitored before or after control channels are combined with the optical signals.

As described in EDFA94 (pages 475-6), it is desirable to control input signal variations at optical switching nodes in optical networks to equalize signals originating from different stations. Either feedback or feed-forward control can be provided to control the signal input power. For example, see Optical Fiber Communication ("OFC") Conference Technical Digest 1997 TuP4, pp. 84-5 ("OFC97-1"), $22^{nd}$ European Conference on Optical Communications 1996 ("ECOC96") 5.49-52 and European Patent Application No. 0829981A2.

While the signal input can be equalized at each node in a network, it generally remains necessary to provide individual amplifier control along an amplifier chain to account for amplifier performance variations. In this regard, EDFA94 (page 472) cautions that "cancellation of transient saturation is achieved by keeping constant not the total EDFA input power, but the sum of all input powers weighted by their respective saturation powers". However, the author concedes that in WDM systems, the required spectral analysis to control amplifiers based on balancing the amplifier saturation is not practical.

Another shortcoming of current control channel schemes is that the schemes can not be used to protect against large power variations, which may occur in dense WDM systems. Large increases in the control channel power during gain transients can produce spectral hole burning in EDFAs that can degrade the system performance to a greater extent than the gain transients itself. As such, current control channel schemes have limited applicability in WDM systems.

In view of the expanding use of WDM systems and the desire to perform optical networking, it is becoming increasingly necessary to provide more precise and versatile amplifier control. The more highly controllable amplifiers and systems will help drive the further development of high capacity, more versatile, longer distance communication systems.

BRIEF SUMMARY OF THE INVENTION

The apparatuses and methods of the present invention address the above need for higher performance optical systems. Optical systems of the present invention generally include an optical signal controller disposed along an optical link between two optical nodes. The optical signal controller is configured to provide a monitoring signal from an optical signal passing between the nodes in a plurality of wavelength sub-bands at least one of which includes a plurality of signal channels. The optical signal controller introduces power in a plurality of compensating channels the intensity of which is a function of the monitoring signal power in the plurality of wavelength sub-bands or the total power. The compensating channels are combined with the optical signal to compensate for power variations in the signal channels passing between the nodes.

In various embodiments, the optical signal controller can be configured to provide analog or digital control over performance variations that occur in one or more optical amplifiers in the link. Performance control is achieved by monitoring the input power to the amplifier in two or more sub-bands of the amplifier wavelength range. The optical signal controller then varies either the power of one or more compensating channels and/or the amplifier power in response to the monitoring signals to minimize the gain variations within each sub-band.

Compensating, or control, channels can be provided to compensate for input power/gain variations within each of the sub-bands. The compensating channels can be at wavelengths within or outside the wavelength range of the compensated sub-band. The compensating channel sources can be responsive to power variations in more than one sub-band. In various embodiments, the power in two or more compensating channels can be varied to maintain an average gain in the remaining signal channels or total optical signal power.

The compensating channels can be introduced at nodes, which include optical components, such as transmit and/or receive terminals, optical routers, switches, and add/drop devices, or at other monitoring points in the link including amplifier sites. Likewise, the compensating channels can be removed at various monitoring points and reinserted to provide flexibility in the control of each sub-band throughout the optical link.

In various embodiments, the compensating channels can be used to carry information signals between two points. For example, one or more of the compensating channels can be used to carry communication traffic (payload) between nodes and/or monitoring points on the link. In this manner, dedicated add/drop capacity can be provided within the link without sacrificing system signal channel capacity. Similarly, one or more of the compensating channels can be used to carry system supervisory information through the link directly between two points.

Optical systems of the present invention can include a plurality of nodes and links interconnected optically and/or electrically to form an optical network. The optical systems can also include network management to provide monitoring, provisioning and control of various network nodes and elements, such as amplifiers, etc., wavelength allocation and provisioning in the optical system.

The controller can generally be operated employing optical-electrical control loops and all-optical loops depending upon the system configuration. In various embodiments, an optical splitter is used to provide the monitoring signal in a wavelength range of interest from the optical signal passing through transmission fiber in the link. In embodiments, the monitoring signal can be provided before or after the insertion of the compensating channels at the input to an amplifier. Alternatively, the power in the sub-bands can be monitored and controlled based on the output of an amplifier.

The wavelength range can be partitioned into sub-bands based on the gain profile of the optical amplifier(s) being used in the system. Each sub-band monitoring signal can be used to control its corresponding compensating channel source to maintain a gain profile within the sub-bands as the optical signals pass through optical amplifiers. It is generally desirable to partition the wavelength range into sub-bands over which the gain profile of the optical amplifier(s) is substantially constant ordoes not greatly vary. In this manner, the variation in the compensating channel power will generally track the variation of the input signal power in that sub-band.

Compensating channels can be used in combination with pump control to compensate for input signal variations in the amplifiers. In some instances, it may be desirable to provide for control in the link using both compensating channels to minimize input power variations and pump control. Alternatively, the monitoring signals can be used to control the gain of the amplifier by varying the pump power, drive current, etc. provided to the amplifier.

In an embodiment, the optical signal controller is positioned before a first of one or more EDFAs. The wavelength range is divided into four contiguous sub-bands spanning the wavelength range of a WDM signal being amplified in the link. One compensating channel at a wavelength within each sub-band is used to compensate for gain variation within the sub-band. The compensating channels are controlled based on the power within the sub-band to substantially compensate for power variations introduced into the optical link. The compensating channels of the present invention can also be used in combination with various AGC and APC schemes at the individual amplifiers. The AGC or APC schemes can use either the signal channels or the compensating channels to control the amplifier performance.

Thus, the apparatuses and methods of the present invention provide for control of the gain profile over a range of wavelengths in optical transmission systems. Accordingly, the present invention addresses the aforementioned problems and provides apparatuses, methods, and optical systems that provide increased control over optical signal characteristics in the system. These advantages and others will become apparent from the following detailed description.

BRIEF DESCRIPTION OF THE DRAWINGS

Embodiments of the present invention will now be described, by way of example only, with reference to the accompanying drawings for the purpose of illustrating embodiments only and not for purposes of limiting the same; wherein like members bear like reference numerals and:

FIGS. 1-4 show optical systems of the present invention.

DESCRIPTION OF THE INVENTION

Figure 4:
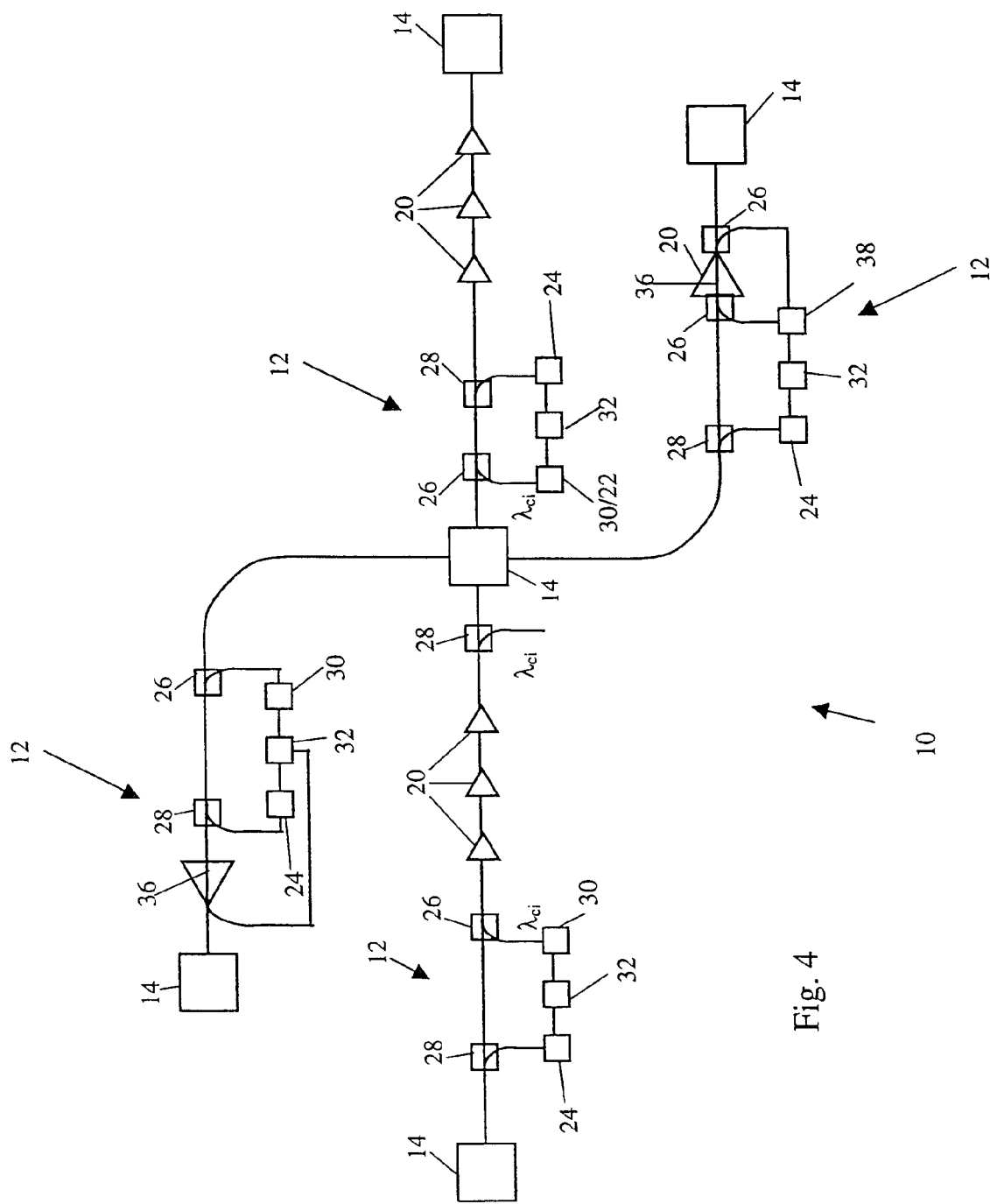

FIG. 1 shows an embodiment of an optical system 10 including an optical controller 12 positioned to control one or more characteristics of an optical signal passing between two optical processing nodes 14 in an optical link 15. The system 10 can be embodied using one or more serially connected point to point links (FIG. 1) or in a network, which can be configured in various architectures (FIG. 2) and controlled by a network management system 16.

The optical signal controller 12 can be disposed at various monitoring points along a transmission fiber 18 in the optical link 15 between two nodes 14, as shown in FIG. 2. For example, the signal controller 12 can be selectively positioned relative to one or more optical amplifiers 20 disposed along the transmission fiber 18 to control the characteristics of the optical signal being amplified in the link 15.

It is often desirable to position the signal controller 12 at the same physical site as one or more of the nodes 14 at the beginning of the optical link 15. In this configuration, the optical signal characteristics can be controlled through the entire link from a logistically convenient location.

As shown in FIG. 3, the optical system 10 will generally include at least one transmitter 22 for transmitting optical signals including at least one information carrying signal wavelength $\lambda_i$, "signal wavelength or channel", through the optical transmission fiber 18. Furthermore, the optical system 10 will generally include at least one optical signal receiver 24 for receiving the optical signals from the fiber 18. Also, the controller 12 can be included near or within the node 14 as shown in FIG. 3.

The system 10 shown in FIG. 3 can be deployed as a WDM system including a plurality of transmitters $22_i$ for providing a plurality of information carrying wavelength $\lambda_n$ to a plurality of receivers $24_j$. Wavelength selective or non-selective optical combiners 26 can be used to combine the optical signals produced by the transmitters $22_i$ into a WDM optical signal that is transmitted through the transmission fiber 18. Optical distributors 28 are provided to distribute, either selectively or non-selectively, the WDM signal to the receivers $24_j$.

The transmitters 22 used in the system 10 will generally include a laser optical source, but can include other coherent as well as suitable incoherent optical sources as appropriate. Information can be imparted to an optical carrier either by directly modulating a laser or by external modulating an optical carrier emitted by the laser. Alternatively, the information can be imparted to an electrical carrier that can be upconverted onto an optical wavelength to produce the optical signal. Similarly, the optical receiver 24 used in the present invention can include optical receivers known in the art employing various detection techniques, such coherent detection, optical filtering and direct detection, and combinations thereof. Additional versatility in systems 10 configured as networks, such as in FIG. 3, can be provided by employing tunable transmitters 22 and receivers 24 in optical nodes 14.

An embodiment of the optical signal controller 12, shown in FIG. 3, includes one or more optical compensation sources 30 for providing power in one or more compensating, or control, channel wavelengths $\lambda_{ci}$, "compensating channels". The compensating channels are combined with the optical signal channels $\lambda_i$ via the combiner 26 and transmitted through the fiber 18 in the link 15. The controller 12 also includes an optical distributor 28, such as a low ratio splitter/tap, to provide a monitoring signal within a wavelength range of interest from the optical signal passing through the transmission fiber 18.

The optical combiners 26 and distributors 28 can include wavelength selective and non-selective ("passive"), fiber and free space devices, as well as polarization sensitive devices. Standard or WDM couplers/splitters, circulators, dichroic devices, prisms, gratings, etc., which can be used alone or in combination with various tunable or fixed wavelength transmissive or reflective filters, such as Bragg gratings 34, Fabry-Perot devices, etc. in various configurations of the optical combiners 26 and distributors 28. Furthermore, the combiners 26 and distributors 28 can include one or more stages incorporating various devices to multiplex, demultiplex, or broadcast signal wavelengths $\lambda_i$ in the optical systems 10.

Source controllers 32 are configured to receive the monitoring signal within respective sub-bands and control the optical compensation sources 30 in response to the monitoring signals. Alternatively, the source controllers 32 can be configured to control the plurality of compensation sources 30 in response to the total optical signal power or a combination of the sub-band and total powers.

The absolute and relative locations where the compensating channels $\lambda_{ci}$ are introduced into the fiber 18 and the monitoring signal is provided from the fiber 18 can be varied as appropriate. The monitoring signal can include both the compensating channels and the signal channels to provide feedback control over the compensating channel powers.

Likewise, the compensating channels $\lambda_{ci}$ can either be removed before or at the end of the link 15 depending upon the system configuration. It is generally desirable to separate and reinsert compensating channels $\lambda_{ci}$ respectively before and after combining signal channels from different links 15 to provide increased system control and flexibility.

The optical signal controller 12 can also be mused to transmit communication traffic (payload) and/or system supervisory information via the compensating channels between nodes 14 or various monitoring points within the link 15. When used to transmit communications traffic, transmitters 22 can generally be used as the optical compensating sources 30. It will be appreciated that appropriate modification of the transmitter 22 to provide for variable power in the signal carrying compensating channels may be necessary.

FIG. 4 shows an embodiment of the optical system 10 including a plurality of optical signal controller 12 embodiments. The controllers 12 can be embodied as feed-forward or feedback control schemes. The source controller 32 can include an optical to electrical converter, such as a wavelength selective or non-selective optical receiver 24 to receive the monitoring signal. The optical to electrical converter can be a photodiode 34 that provides an electrical monitoring signal to the source controller 32, which is used to control one or more optical compensation sources 30 and/or optical amplifiers 20. As shown in FIG. 4, the amplifier 20 can include doped, i.e., erbium, or Raman fiber amplifiers 36 supplied with pump energy supplied by a pump source 38, as well as other optical amplifiers. The source controller 32 can be configured to control the pump source 38 in response to the monitoring signal.

The optical signal controller 12 can be configured to maintain a substantially constant optical signal power distribution in optical links 15. A constant optical power distribution in the links 15, facilitates substantially constant optical amplifier gain performance. Thus, the gain of the individual signal channel being transmitted through the link 15 can be controlled to a substantially constant value, if desired. In addition, the power of the individual signal channels can be controlled to maintain uniform and non-uniform gain profiles over the wavelength range as may be desired.

In various embodiments, the optical signal controller 12 employs a plurality of compensating channels to maintain a substantially constant gain profile for the optical signal in the link 15. The compensating channel wavelengths $\lambda_{ci}$ can be within or outside corresponding sub-band wavelength ranges of the optical signals being transmitted in the link 15. For example, the wavelength range of the signal channels in the link 15 could be divided into four adjacent sub-bands, each of which include a compensating channel at a wavelength within the sub-band. The compensating channels can be controlled in feed-forward or feedback schemes and can also be used in various AGC and APC schemes used to control the individual amplifiers.

The optical signal controller 12 is generally configured to compensate for power changes within the sub-bands of the optical signal before the amplifier gain profile is substantially impacted. For example, the optical signal controller 12 responds to a sudden reduction of the optical power within a sub-band by increasing the optical power supplied by the optical compensating source 30 associated with that sub-band. Likewise, if an increase in optical power is detected in the sub-band, the controller 12 must decrease the optical power output supplied by the compensating source 30 on a similar time scale.

The required response time of the controller 12 is a function of the number of cascaded amplifiers in the link 15. One of ordinary skill will appreciate that the required response time affects the choice of electronics to practice various embodiments of the invention.

Figure 5C:
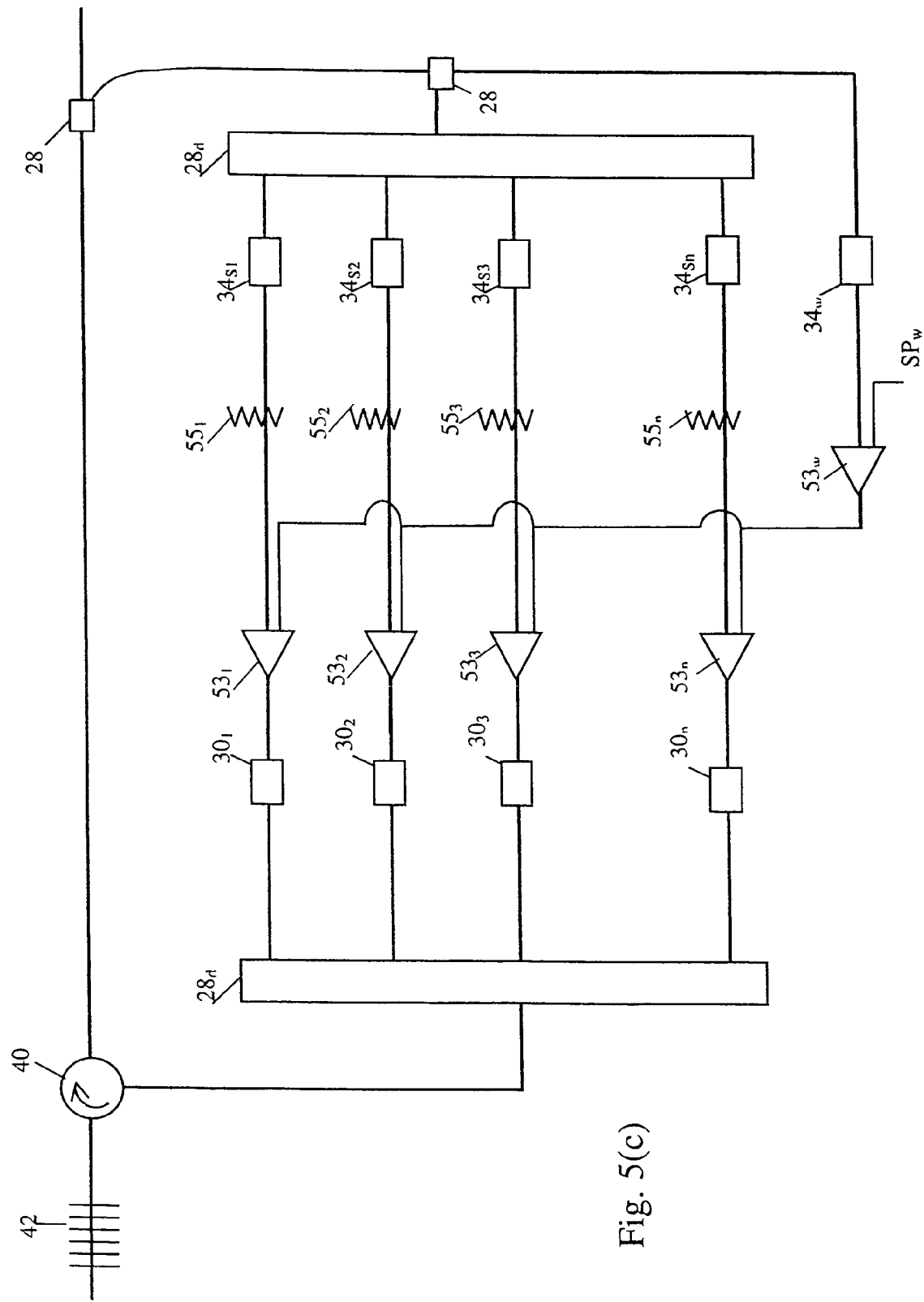
FIGS. 5-8 show controller embodiments of the present invention; and,
FIGS. 9-10 show various optical source embodiments of the present invention.

FIGS. 5(a-c) show an exemplary layouts of a digital and analog sub-band control loops that can be used in the controller 12 to control the sub-band compensating channel power. Generally, the controller 12 includes a sub-band demultiplexer $28_d$ to separate the monitoring signal into sub-band optical signals. Optical to electrical converters, such as photodiodes 34, are used to detect the sub-band optical signal and generate electrical monitoring sub-band input signals $S_i$. The sub-band source controller 32 uses the electrical monitoring input signals $S_i$ to vary the compensating channel power provided by the sub-band compensating source 30 in response to fluctuations in the sub-band input signal power. A low loss combiner 26, such as a circulator 40 and Bragg grating 42 arrangement, can be used to combine compensating channels with the WDM signal channel in the transmission fiber 18.

As further shown in FIG. 5(a), the sub-band source controller 32 will generally include an analog to digital ("A/D") converter 44 to provide the sub-band input signal $S_i$ as a digital signal to a sub-band input comparator differencing circuit 46. A setpoint power $SP_i$, which can be programmable, is provided for each sub-band to the differencing circuit 46 and a monitor input error $E_i$ is generated. The differencing circuit 46 can provide the absolute error calculated or apply an error threshold to the calculated error. The error threshold can be programmably set to minimize jitter or other noise in the signal from causing unnecessary, and possibly destabilizing, power variations in the control loop.

An error accumulator circuit 48 is used to provide a digital bias drive signal $B_i$ in response to the monitor error signal $E_i$ to a digital to analog ("D/A") converter 50 to control the compensating channel power supplied by the sub-band optical source 30. An exemplary error accumulator circuit 48 for a sub-band control loop is shown in FIG. 5(*b*) as an overall high-pass filter arrangement. It will be appreciated that other filter arrangements can be used in the error accumulator circuit 48. The arrangement shown in FIG. 5(*b*) is configured to drive detected signal channel input power variations to zero by varying the output power of the source 30 in response to the detected variations. The bandwidth of the high-pass filter response generally establishes the length of time during which the control laser output level is perturbed before the correction occurs.

In the error accumulator circuit 48, the setpoint power input error $E_i$ is amplified using a first signal amplifier $52_1$ and provided to a summing circuit 56, which accumulates the error. A feedback loop including a second amplifier $52_2$ and an addressable memory 54 is used to implement the necessary bias signal value storage function of the error accumulator. The stored bias signal value is fed back to the summing circuit 56. The bias signal can be used to directly vary the output power of the sources 30 and thereby the compensating channel power. Alternatively, the output of the error accumulator circuit 48 can be used to control an external modulator or optical attenuator to vary the compensating channel power being introduced into the transmission fiber 18.

The response of the controller 12 shown in FIG. 5(*b*) can be modeled using a sampled-time analysis, where the z-transform of the control loop transfer function can be derived as:

$$B_{out} = B_{in} - B_{out}(G_1/(z-G_2));$$

$B_{out}/B_{in}(z) = (z-G_2)/(z-(G_2-G_1))$ and the frequency response is $B_{out}/B_{in}(\omega) = (e^{j\omega T}-G_2)/(e^{j\omega T}-(G_2-G_1))$.

$B_{in}$ and $B_{out}$=input and output bias signal, respectively,
$G_1$ & $G_2$=gain of amplifiers $52_1$ and $52_2$, respectively,
T=sample time,
ω=frequency,
$z=e^{j\omega T}$ (transform of the frequency)

In the embodiments shown FIG. 5(*a*), a monitoring signal is removed from the input transmission fiber $18_f$, after the compensating channelsignal has been inserted into the fiber 18. Thus, the monitoring signal includes both the signal channels and the compensating channels. As previously discussed, the monitoring signal can be removed before the compensating channels are introduced, so as to include only the signal channels, if so desired. Also, the monitoring signal can be passively or actively removed from the fiber in either a wavelength selective or non-selective manner. Typically, the monitoring signal will be removed by employing a low coupling ratio, non-wavelength selective tap coupler to split off a small percentage of the total signal.

The control loops can alternatively be implemented as an analog circuit, an example of which is shown in FIG. 5(*c*). The output from the sub-band photodetectors $34_s$ are provided to respective analog differencing amplifiers $53_i$, either directly or via a fixed or variable attenuator $55_i$, which can be used to provide additional control the sub-band loop. A wideband detector photodiode $34_w$ can be used to measure the total input power of the monitoring signal. The total input power can be compared to a total power set point in one of the differencing amplifiers 53 and a total input power correction provided to the sub-band differencing amplifiers 53.

Figure 6:
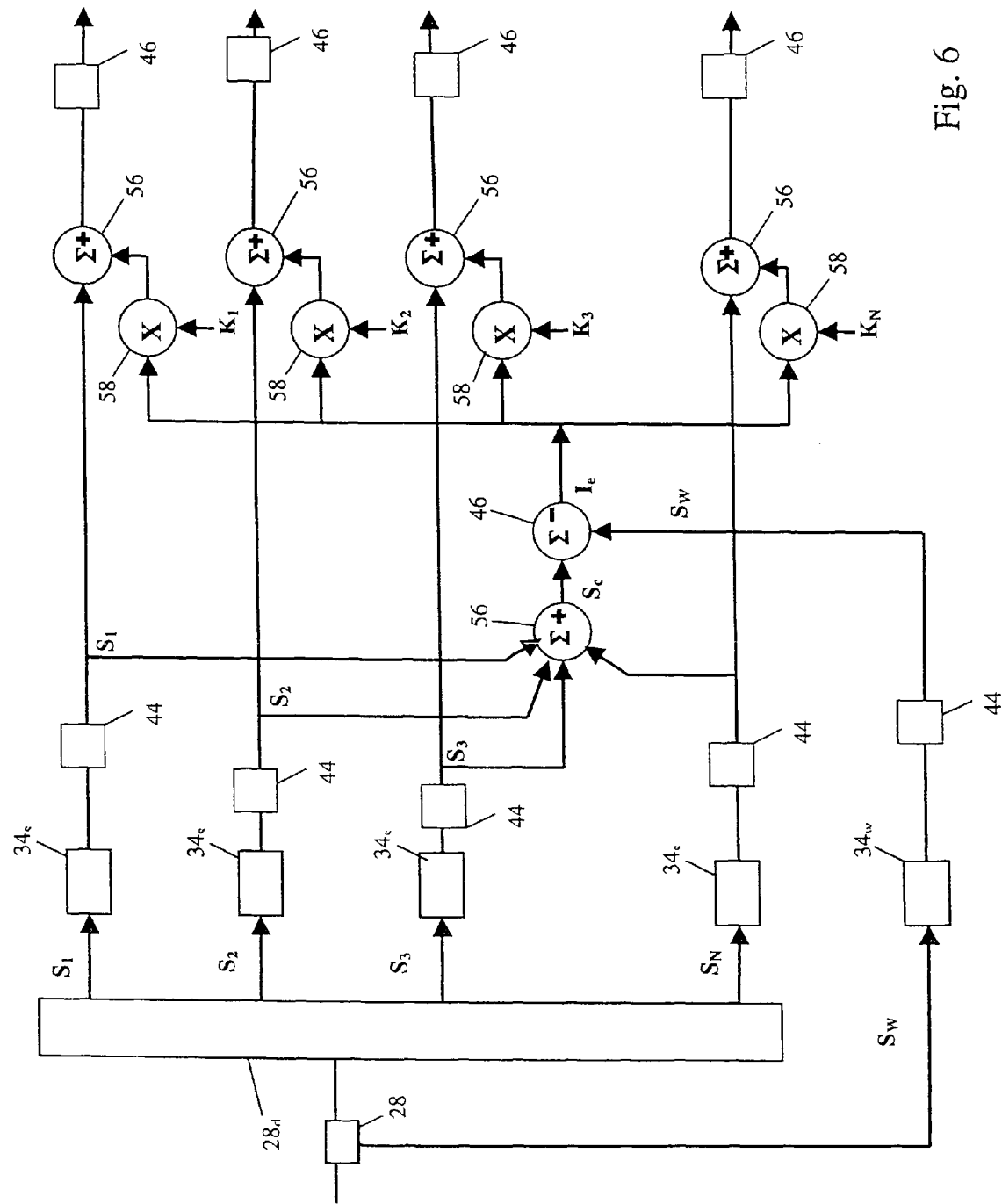

Similarly, in various digital embodiments generally shown by FIG. 6, the wideband detector photodiode $34_w$ can also be incorporated to provide a wideband monitoring signal $S_w$ for input power error correction. The electrical sub-band monitoring input signals $S_i$ are summed in another summing circuit 56 into a composite sub-band input signal $S_c$, which is compared to the wideband monitoring signal $S_w$ in another comparator/differencing circuit 46. An input offset signal $I_e$ is generated by the differencing circuit 46 and sent to each of the sub-band control loops. A multiplying circuit 58 allocates the input offset $I_e$ based on sub-band error allocation setpoints $K_i$. The input offset $I_e$ can be added to either the sub-band monitoring input signal $S_i$ or the setpoint power input error signal $E_i$ depending upon the control loop configuration.

A mismatch between the composite sub-band signals $S_c$ and the wideband detector signal $S_w$ is indicative of variations in the frequency demultiplexer $28_d$, the sub-band detectors $34_s$, or the wideband detector $34_w$. Error allocation in the controller 12 can be performed via numerous algorithms and statically or dynamically allocated in various distributions depending on the controller 12 configuration. For example, individual setpoints $K_i$ and multiplying circuits 58 can be provided for each sub-band or a common multiplying circuit 58 can be used to equally distribute various errors in the controller 12.

The signal controller 12 can include one or more central processors 60 to monitor and control the sub-band control loops. The processors 60 can communicate with the network management system 16 to receive instructions and provide performance information, such as when non-zero input offset $I_e$ or other performance variations that occur in the controller 12.

Figure 7:
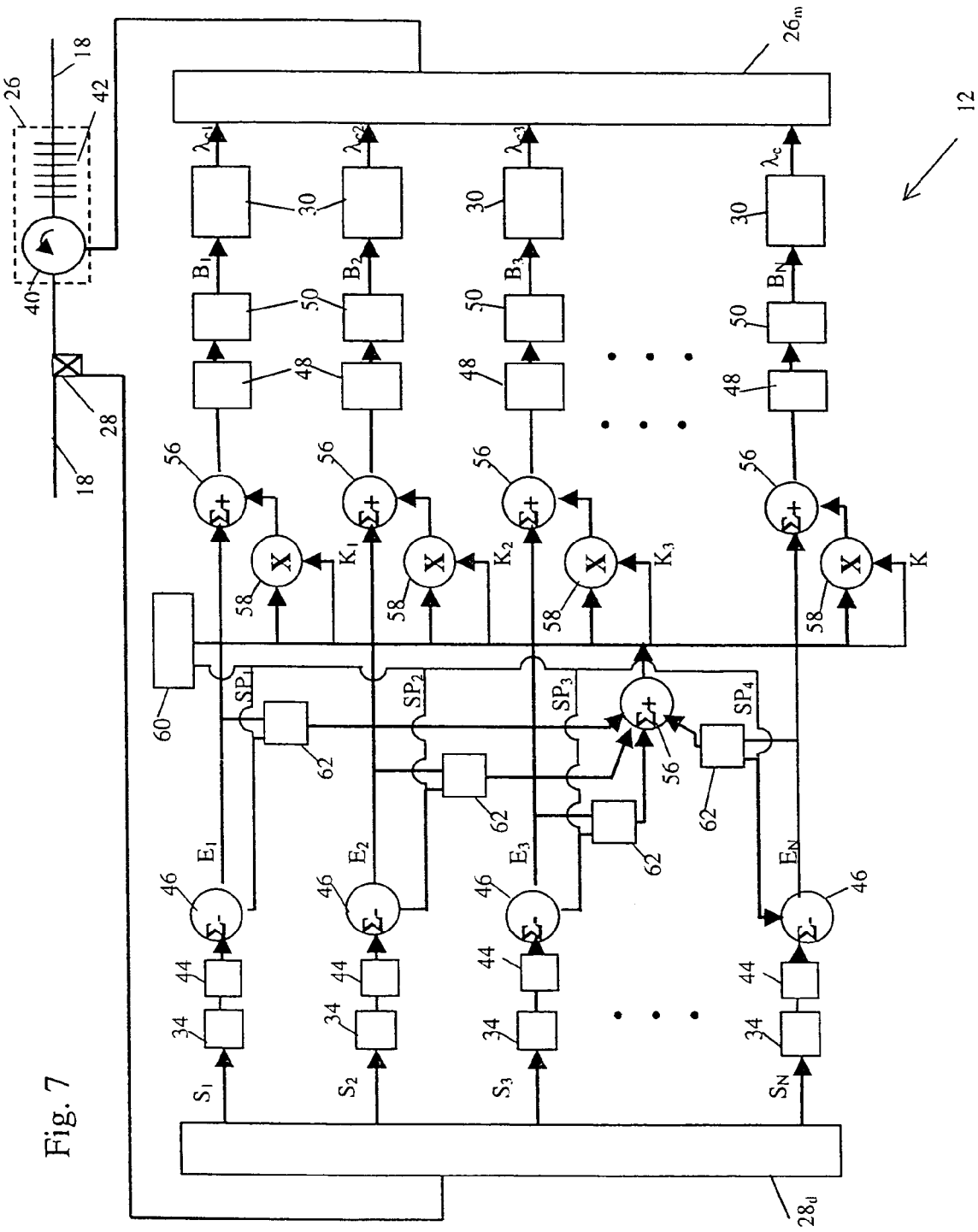

Analogous to the input offset monitoring, fault monitoring and remediation can be provided using an error distribution loop, as shown in FIG. 7, to redirect sub-band gain control to other viable loops in the event of a sub-band loop failure. In various embodiments, the set point input error $E_i$ is compared with the set point power $SP_i$ to determine whether a sub-band control loop has failed. When a sub-band control loop failure is detected, a line switch 62 passes a failure error signal, typically the set point value $SP_i$, to another summing circuit 56, which accumulates the failure error signals from the sub-bands. The control loop failure determination can be performed using the central processor 60 or a locally employed decision circuit in the line switch 62. The central processor 60 can also be used to make appropriate modifications to the correction set points for the remaining control loops depending upon the failure. In addition, the failure determination decision threshold can be programmably implemented to provide flexibility in the controller 12.

Figure 8:
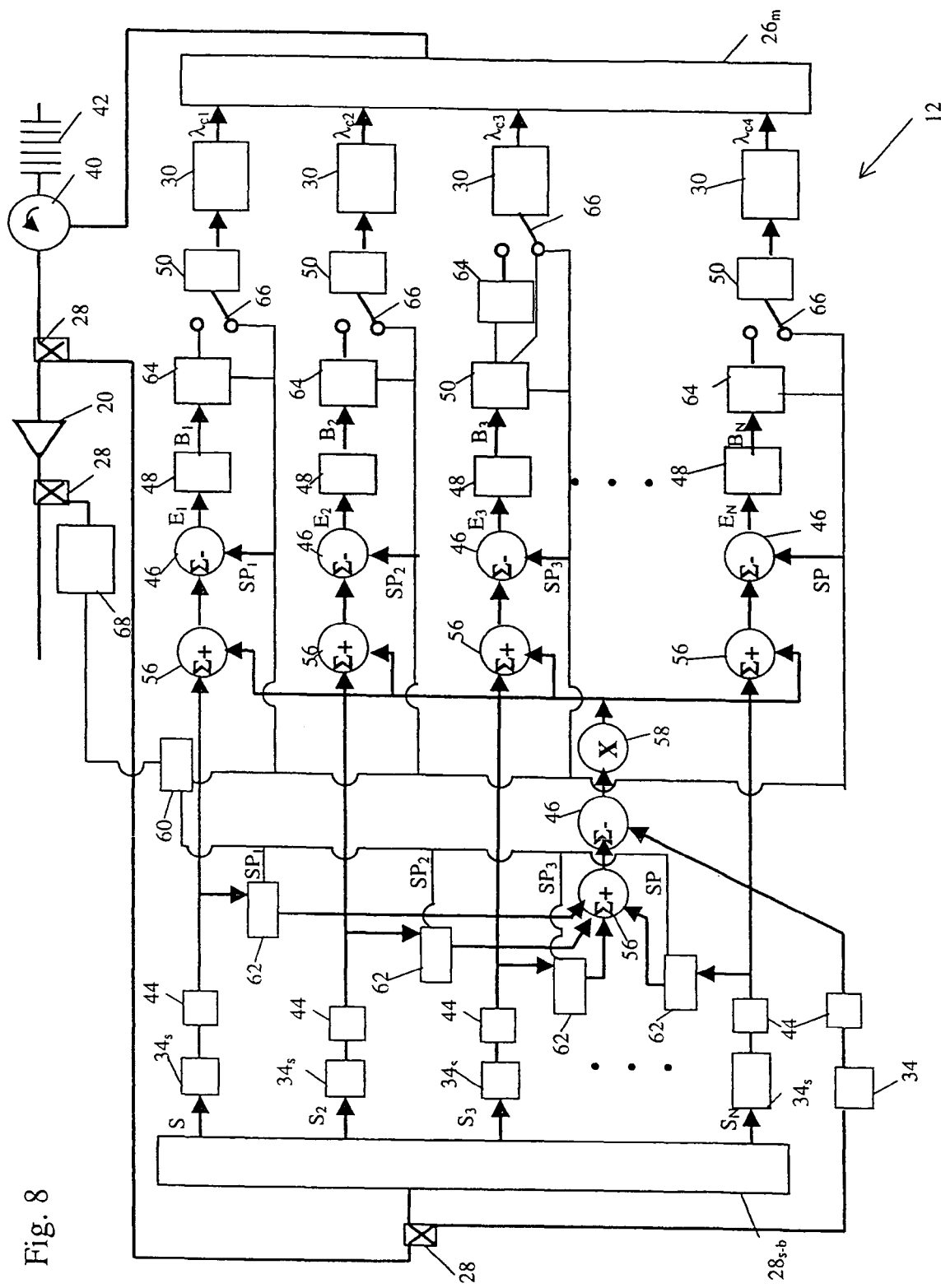

Alternatively, the decision circuit 62 can compare the input set point $SP_i$ directly with the sub-band input $S_i$, as in FIG. 8. A common multiplying circuit 58 is also shown in the embodiment of FIG. 8, in which the error from a failed sub-band loop is evenly distributed among the surviving loops.

The various errors in the control loops can be distributed using any number of schemes. For example, the error can be distributed among the surviving sub-band loops to maintain the gain profile of the optical signal. Alternately, the cumulative failure error signals may be divided among the remaining loops according to the inverse proportion of the current laser bias of each loop. This method would lessen the probability that any one of the surviving sub-band loops would be overloaded upon the failure of an adjacent sub-band loop. The central processor 60 can be used to monitor the redistribution of the error and modify the redistribution to equalize or balance the power output from the sub-band loops depending upon the channel profile to be maintained.

The accuracy and speed of response of the controller 12 depends on a stable response from the optical compensating sources 30 to the bias drive level. The speed and accuracy of the response will generally vary over time; therefore, recalibration of the controller 12 will most likely be required to maintain performance levels.

As shown in FIG. 8, one or more of the central processors 60 in the controller 12 can be used to oversee the operation and perform calibration of the sub-band control loops. Each control loop can include a calibration device 64 for controlling the drive signal applied to the optical source 30. The calibration device 64 can be a digital device, such as a calibration table, or an analog device, such as a linear circuit.

During calibration, a switch 66 is used to by-pass the calibration device 64 and allow the central processor 60 to apply one or more test bias signal to the sub-band sources 30. As shown in FIG. 8, the position of the switch 66 will depend on whether an analog or digital calibration device 64 is implemented in the optical signal controller 12. The error distribution loop and fault control techniques previously described will adjust the compensating channel sources 30 that remain in operation to compensate for the variation in the compensating channel from the source 30 being calibrated.

The optical power of the source 30 can be calibrated by various known methods, for example by using a series of stepped bias levels. An optical spectrum analyzer ("OSA") or other wavelength selective receiver 68 can be used to measure the test output power of the selected source 30 independently of the photodiode 34 associated with a particular sub-band. Alternatively, the test output power can be detected using the sub-band photodiode $34_s$ in the sub-band loop being calibrated. When used in combination, the OSA 68 can be used to calibrate the sub-band photodiode $34_s$, as well as the sub-sand source 30 and other components in the sub-band control loop.

The detected test output power from either the OSA 68 or sub-band photodiode 34 is fed back to the central processor 60 for characterization of the source 30 being calibrated. The characterization can be used to develop a new calibration table for the source 30, which can be implemented when the source 30 is brought back on-line. In this manner, each source 30 in the controller 12 can be calibrated without removing the controller 12 from on-line operation. While it is possible to configure the controller 12 to perform simultaneous multiple calibrations, it is generally not desirable given the power distribution that may be necessary in the remaining operational sub-band control loops.

In embodiments exemplified in FIG. 8, the OSA 68 is positioned to calibrate the sources 30 based on the sub-band signal in the transmission fiber 18. It will be appreciated that the OSA 68 can be included within the controller 12 to more specifically calibrate the optical sources 30. In some embodiments, it may be possible to substitute the OSA 68 for the wideband photodiode $34_w$ used to determine the sub-band input power offset.

The optical sources 30 used in the present invention can be conventional diode lasers as known in the art. As previously discussed, communication traffic or system supervisory information can be sent using the compensating channel, if an appropriate transmitter 22 is used as the source 30.

The optical source 30 used in the controller 12 generally have to be capable of operation over a wide power range to maintain the optical signal gain profile upon the failure of one or more sub-band control loops. The bandwidth of the source 30 must therefore be sufficiently broad to prevent Stimulated Brillouin Scattering ("SBS") during high power operation and sufficiently narrow not to interfere with adjacent signal channels. Broad band optical sources or narrow band sources that have been broadened, via dithering, external cavity gratings, or other techniques, can be used as the optical sources 30.

For example, the optical source 30 can be embodied as semiconductor optical amplifier ("SOA"), or fiber laser, 70 operated in a lasing mode and stabilized to a desired wavelength as shown in FIG. 9(a-d). The SOA 70 can provide compensating channels over a wide power range and Bragg gratings 42, or other reflective elements 78, can be used to control the lasing wavelength and bandwidth. For example, in FIG. 9(a), a high reflectivity Bragg grating $42_H$ and a lower reflectivity grating $42_L$ can be written into fiber pigtails on the SOA 70 to control the lasing wavelength. In FIG. 9(b), a Bragg grating is provided on an output port of a passive or wavelength selective coupler 72 in a ring configuration with the SOA 70. In various embodiments, the reflective element 78, i.e., Bragg grating 42, can be tuned to vary the output wavelength of the SOA source 30.

As shown in FIGS. 9(c-d), the optical source 30 can include the SOA 70, or a fiber laser, that is frequency stabilized using a feedback loop incorporating a saturable absorber 74, such as an unpumped erbium fiber. In embodiments exemplified by FIG. 9(c), an external cavity is formed using a three port circulator 40 in a feedback ring configuration and a wideband reflective device 78. Course mode selection in the feedback ring can be made using a narrow pass filter 76, such as a Fabry-Perot filter. The saturable absorber 74 serves to lock the lasing mode of the SOA 70 or fiber laser within the passband of the filter 76.

Similarly, the circulator 40 can be replaced by a wavelength selective or passive coupler 72 and the SOA 70, or fiber laser, can be incorporated into the ring as shown in FIG. 9(d). Furthermore, an isolator 80 can be employed to provide a unidirectional propagation in the ring embodiments.

Course wavelength selection in saturable absorber embodiments will generally provide one or more lasing modes within the desired wavelength range, one of which will tend to become the dominant mode. As the dominant mode or modes emerge, the saturable absorber 74 will act to prevent mode hopping because of the high loss associated with modes outside the saturating dominant modes. Also, an external frequency source can be used in place of the narrow band filter 76 to select the saturating mode/frequency emitted by the source 30. The embodiments of FIGS. 9(a-d) have been described with respect to providing compensating channels, but can also be deployed as fixed or tunable wavelength optical sources in optical transmitters, local oscillators, and other optical source applications.

In another embodiment, the compensating channel provided by the optical source 30 can be broadened using embodiments shown in FIGS. 10(a&b). For example, the compensating channel can be phase modulated to maintain the compensating channel power, while broadening the signal by creating sidebands (FIG. 10(a)). A phase modulator 82 can be driven at multiple frequencies to control SBS in fibers having different core sizes and susceptibilities to SBS. The wavelength of the source 30, such as provided by a DFB laser, can be controlled using frequency locking devices 84 and schemes as is known in the art. Likewise, narrow band reflective devices 78, such as narrow band Bragg gratings 42, can be employed to further control the wavelength of the laser.

Similarly, the optical source 30, such as a DFB laser, can be dithered or modulated directly to broaden the linewidth of the source 30, as shown in FIG. 10(b). The amplitude of the dithering or modulating of the laser drive current can be varied with power to further decrease the susceptibility to SBS. As in FIG. 10(a) embodiments, the wavelength of the optical source 30 can be controlled using various narrow band wavelength selective devices 78, such as Bragg gratings.

Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. An apparatus comprising:
an optical signal controller configured to provide a monitoring signal from an optical signal in a plurality of sub-band signals at least one of which includes a plurality of optical signal channels, and control the characteristics of the optical signal based on the sub-band signal characteristics, wherein said optical signal controller is configured to combine a compensating channel having a power based on the sub-band signal powers with the optical signal channels for transmission of both the compensating channel and the optical signal channels through at least two optical amplifiers to control the characteristics of the optical signal channels passing through the at least two optical amplifiers via a combined compensating channel and optical signal channels.

2. The apparatus of claim 1, wherein said controller includes a plurality of compensating channel sources providing compensating channels having powers based on the sub-band signal powers.

3. The apparatus of claim 2, wherein at least one of said plurality of compensating channel sources is configured to compensate for power variations in said other compensating sources.

4. The apparatus of claim 1, wherein said controller includes at least one compensating channel source for each of the plurality of sub-bands.

5. The apparatus of claim 4, wherein said controller includes one compensating channel source for each sub-band and each of said compensating sources provides a sub-band compensating channel at a wavelength within the sub-band and the power of the sub-band compensating channel is controlled to maintain an optical signal gain profile within the sub-bands.

6. An optical system comprising:
at least two optical nodes configured to pass an optical signal via an optical transmission fiber between said at least two nodes; and,
an optical signal controller configured to provide a portion of the optical signal as a monitoring signal in a plurality of sub-band signals at least one of which includes a plurality of optical signal channels, and control the characteristics of the optical signal based on the sib-band signal characteristics;
wherein said optical signal controller is configured to combine a compensating channel having a power based on the sub-band signal powers with the optical signal channels for transmission of both the compensating channel and the optical signal channels through at least two optical amplifiers to control the characteristics of the optical signal channels passing through the at least two optical amplifiers via a combined compensating channel and optical signal channels.

7. The optical system of claim 6, wherein:
said optical signal controller is configured to separate a portion of the optical signal into a plurality of wavelength sub-band signals and combine a compensating channel having a power sufficient to maintain a gain profile in the optical signal amplified by at least one of the optical amplifiers.

8. The optical system of claim 7, wherein said signal controller is configured to receive a feedback signal from at least one of the optical amplifiers and control the power of at least one of the compensating channels.

9. The optical system of claim 6, wherein:
said optical signal controller is configured to separate a portion of the optical signal into a plurality of sub-band signals and control the gain profile of the optical signal being amplified by at least one of the optical amplifiers based on the sub-band signal powers.

10. The optical system of claim 9, wherein said optical signal controller controls the amplification of the optical signals by varying the optical energy supplied by a pump source to said at least one amplifier based on the sub-band signal powers.

11. The optical system of claim 6, wherein:
said at least one optical amplifier is configured to amplify the optical signal within a wavelength range;
said controller is configured to control variations in the amplification of the optical signal over the wavelength range by varying the compensating channel powers based on the sub-band signal powers.

12. The optical system of claim 11, wherein said controller is configured to maintain a gain profile in the optical signal over the wavelength range.

13. The optical system of claim 11, wherein said controller is configured to maintain a gain profile in the optical signal in the sub-band wavelength range by varying the power of a compensating channel at a wavelength within the sub-band wavelength range.

14. The optical system of claim 6, wherein:
a first of said optical nodes includes at least an optical transmitter configured to transmit the optical signal in the optical transmission fiber;
a second of said optical nodes includes at least an optical receiver configured to receive the optical signal transmitted in said optical transmission fiber; and,
at least one of the optical amplifiers disposed along said transmission fiber is configured to amplify the optical signal within a wavelength range; and,
said optical signal controller is configured to combine a compensating channel having a power to maintain a constant amplification of the optical signal by said amplifier.

15. The optical system of claim 6, wherein:
said system includes a network management system in communication with said signal controller; and,
said signal controller includes at least one central processor configured to control said sub-band control loops and communicate with said network management system.

16. The optical system of claim 6, wherein said nodes include optical components selected from the group consisting of optical transmitters, optical receivers, optical routers, optical add/drop devices, optical switches, and combinations thereof.

17. The optical system of claim 6, wherein said signal controller provides a compensating channel carrying at least one of communication signals and system supervisory signals.

18. The optical system of claim 17, wherein said controller provides a compensating channel carrying supervisory signals between said nodes.

19. A method of controlling optical signal characteristics comprising:
providing an monitoring signal from an optical signal;
separating the monitoring signal into a plurality of sub-band signals, one of which includes a plurality of optical signal channels;
controlling the characteristics of the optical signal based on characteristics of the sub-band signals, wherein said controlling includes:

generating at least one compensating channel to control at least one characteristic of the optical signal channels passing through at least two optical amplifiers based on the at least one characteristic in the sub-band signals;

combining the at least one compensating channel with the optical signal channels for transmission of both the compensating channel and the optical signal channels through the at least two optical amplifiers.

20. The method of claim 19, wherein:

said method includes amplifying the optical signal; and, said generating includes generating a compensating channel for each of the sub-band signals to maintain a constant amplification of each channel in the optical signals being amplified.

21. The method of claim 20, wherein said controlling includes clamping the gain of at least one compensating channel being amplified.

22. The method of claim 19, wherein said generating includes generating at least one compensating channel to maintain a constant power in the optical signal based on the sub-band signal powers.

23. The method of claim 19, wherein said generating includes generating at least one compensating channel for each of the sub-band signals to maintain a constant power in each sub-band of the optical signal.

* * * * *